United States Patent [19]
Herzog et al.

[11] 3,766,393
[45] Oct. 16, 1973

[54] OPTICAL DATA TRANSMISSION SYSTEM EMPLOYING POLARIZATION-SHIFT, MULTIPLE-CAVITY LASER

[75] Inventors: Donald George Herzog, Collingswood ; Charles William Reno, Haddonfield, both of N.J.

[73] Assignee: RCA Corporation, New York, N.Y.

[22] Filed: Nov. 22, 1971

[21] Appl. No.: 200,716

[52] U.S. Cl. ............................... 250/199, 331/94.5
[51] Int. Cl. ............................................. H04b 9/00
[58] Field of Search ............... 250/199; 331/94.5 C, 331/94.5 S; 307/88.3; 321/69 R, 69 NL; 332/7.51

[56] References Cited
UNITED STATES PATENTS

| | | | |
|---|---|---|---|
| 3,482,184 | 12/1969 | Schneider | 331/94.5 C |
| 3,551,840 | 12/1970 | Crowell | 250/199 |
| 3,423,588 | 1/1969 | Uchida | 250/199 |
| 3,663,897 | 5/1972 | Broom | 331/94.5 C |

OTHER PUBLICATIONS

J. Kupka, "Electronics Letters," Freq. Mod. Single Modes, Vol. 2/7 No. 2, 1/26/68

*Primary Examiner*—Albert J. Mayer
*Attorney*—Edward J. Norton

[57] ABSTRACT

An internally-modulated laser in which first, second and third reflectors and a polarization means are oriented with respect to each other both to provide a first optical resonant cavity, defined by the first and second reflectors, and a second optical resonant cavity, defined by the first and third reflectors. A laser medium is located in the common portion of the cavities between the first reflector and the polarization means, and an individual data-signal-responsive modulator is situated in each respective individual portion of the cavities between the polarization means and the respective second or third reflector. The first cavity supports a given polarization and the second cavity supports a polarization orthogonal to the given polarization. The modulated output wave energy provided by this apparatus includes two separate orthogonally polarized data channels.

5 Claims, 5 Drawing Figures

OPTICAL DATA TRANSMISSION SYSTEM EMPLOYING POLARIZATION-SHIFT, MULTIPLE-CAVITY LASER

This invention relates to optical data transmission systems incorporating an internally-modulated laser and, more particularly, to improved apparatus therefor capable of transmitting data at a high effective information rate with relatively high power efficiency.

Briefly in accordance with one aspect of the present invention, first, second and third reflectors and a polarization means are oriented with respect to each other both to provide a first optical resonant cavity, defined by the first and second reflectors, for wave energy of a given wave length which has a first given linear polarization, and to provide a second optical resonant cavity, defined by the first and third reflectors, for wave energy of this given wavelength having a second linear polarization orthogonal to the given linear polarization. Therefore, the two optical resonant cavities include one portion which is common to both cavities and other respective portions which are individual to each of the respective cavities. A lasing medium capable of generating wave energy at the given wavelength is located in the common portion and an individual data-responsive polarization modulator is situated in each respective individual portion of the cavities. The output wave energy provided by this apparatus includes two separate, orthogonally-polarized data channels.

This and other features and advantages of the present invention will become apparent from the following detailed description, taken together with the accompanying drawing, in which.

Figure 1:
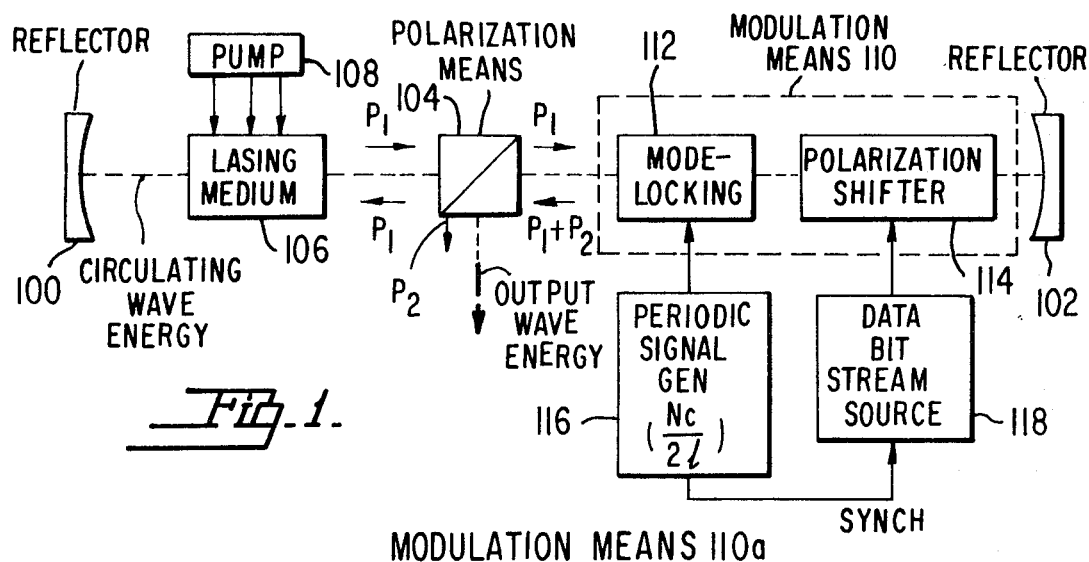
FIG. 1 is a block diagram of an optical data transmission system employing only a single optical resonant cavity incorporating an internally-modulated mode-locked laser for transmitting digital data.

Referring to FIG. 1, there is shown a pair of spaced, parallel reflectors 100 and 102 defining an optical resonant cavity of given length therebetween. Within this optical resonant cavity, and in spaced relationship with both reflectors 100 and 102, is polarization means 104. Polarization means 104, by way of example, may consist of a Glan prism or a Wollaston prism.

Lasing medium 106 is situated, as shown, within the optical resonant cavity between and in spaced relationship with reflector 100 and polarization means 104. Lasing medium 106 may consist of neodymium doped YAG, by way of example. Lasing medium 106 is excited by incident radiation (designated by the arrows) from pump 108.

Situated within the optical resonant cavity, between reflector 102 and polarization means 104 and in spaced relationship therewith, is modulation means 110. The embodiment of modulation means 110 shown in FIG. 1 is composed of a separate mode-locking element 112 and a polarization shifter 114. (An alternative modulation means 110a, shown in FIG. 1a, will be discussed below.)

Mode-locking element 112 may consist of means, such as an electro-optic crystal, for phase modulating wave energy passing therethrough in accordance with the signal applied thereto from periodic signal generator 116, or, alternatively, it may consist of means, such as an acousto-optic element or a signal-responsive absorbing element, for amplitude modulating the wave energy passing therethrough in accordance with the signal applied thereto from periodic signal generator 116.

Polarization shifter 114, which also may consist of an electro-optic crystal, shifts the polarization of wave energy passing therethrough in accordance with the signal level applied thereto from data bit stream source 118. The data bit stream of source 118 is synchronized by a synchronizing input applied thereto from periodic signal generator 116, as shown.

The signal from periodic signal generator 116 is preferably sinusoidal, but may have a different wave shape. In any case, as indicated in block 116 of FIG. 1, the frequency of the periodic signal is equal to the product of any given integer, N, and the speed of light, c, divided by twice the optical length, $l$, of the optical resonant cavity defined by reflectors 100 and 102. Data stream source 118 applies a first signal level to polarization shifter 114 in response to data bits manifesting a binary "ZERO" and a second level to polarization shifter 114 in response to data bits manifesting a binary "ONE."

The operation of the apparatus shown in FIG. 1 will now be discussed. In response to the pumping thereof by pump 108, lasing medium 106 is capable of emitting wave energy at a given wavelength. Any of this wave energy which is incident on either reflector 100 or reflector 102, respectively, will be reflected therefrom and retained within the optical resonant cavity defined by these reflectors.

Polarization means 104 is oriented to pass therethrough and retain within the optical resonant cavity only that first component thereof which has a given linear polarization $P_1$ (polarized, say, in the plane of the paper). Any second component of wave energy having a linear polarization $P_2$ orthogonal to the given polarization (polarized, say, perpendicular to the plane of the paper) incident on the left side of polarization means 104, would be, were it present, directed through the top of polarization means 104 to the outside of the optical resonant cavity defined by reflectors 100 and 102. Similarly, any of this $P_2$ linearly polarized second component of wave energy incident on the right side of polarization means 104, which may be present, is directed through the bottom side of polarization means 104 to the outside of the optical resonant cavity defined by reflectors 100 and 102, and constitutes output wave energy. Thus, the presence of polarization means 104 within the optical resonant cavity defined by reflectors 100 and 102 ensures that the circulating wave energy retained within the optical resonant cavity and incident on the left side of polarization means 104 must have only the given linear polarization $P_1$. However, due to the presence and relative location of polarization shifter 114, the wave energy incident on the right side of polarization means 104 may include a $P_2$ linearly polarized second component.

As stated above, polarization shifter 114 may be an electro-optic crystal. As is known, an electro-optic crystal, in general, produces eliptically polarized output wave energy in response to incident wave energy, regardless of whether the incident wave energy is linearly polarized or not. Any such eliptically polarized wave energy can be considered to be the resultant of a first component having the given polarization $P_1$ and a second component having a polarization $P_2$ orthogonal thereto. As is known, an electro-optic crystal operates by dividing the incident wave energy into respective ordinary and extraordinary wave components, which are oriented in quadrature with respect to each other, and then provides a relative difference in phase delay between the ordinary and extraordinary wave components. For any given electro-optic crystal of any given path length, this relative difference in phase delay is a function of the magnitude of the signal level applied to the electro-optic crystal.

The sensitivity of polarization shifter 114 (i.e., the change in polarization per change in level of the data signal applied thereto) depends upon the effective optical length of the polarization shifter electro-optic crystal and the ratio of the peak amplitudes of the ordinary and extraordinary waves traveling therein. The effective length of polarization shifter 114 is twice its actual length, since due to the presence of reflector 102, wave energy traveling both from left to right and from right to the left passes through polarization shifter 114, thereby doubling its sensitivity. Further, the electro-optic crystal of polarization shifter 114 is preferably oriented with its optic axis lying in a plane normal to the direction of travel of the wave energy therethrough and being disposed at an angle of substantially 45° with respect to each of respective linear polarizations $P_1$ and $P_2$. Under these conditions, the relative amplitudes of the ordinary and extraordinary wave components will be substantially equal and the sensitivity of polarization shifter 114 will be substantially maximum.

The wave energy traveling from left to right, which emerges from polarization means 104 and is incident on the left face of polarization shifter 114, must inherently have the linear polarization $P_1$, since polarization means 104 retains only wave energy with linear polarization $P_1$ within the resonant optical cavity. However, the wave energy traveling from right to left which emerges from the left face of polarization shifter 114 may include a component of wave energy having a linear polarization $P_2$, which component has an amplitude determined by the total phase delay between the ordinary and extraordinary portions of the wave energy experienced during their round-trip passage through polarization shifter 114. However, in the special case where this total phase delay happens to be equal to an integral number of wave lengths of the wave energy in the optical resonant cavity, the amplitude of the $P_2$ linear polarization component of the wave energy traveling from right to left which energes from the left end of polarization shifter 114 will be zero.

Furthermore, this total phase delay, and hence the polarization shift experienced, depends upon the level of the signal applied to polarization shifter 114 from data bit stream source 118. In general, the amplitude of the $P_2$ linearly polarized component in the wave energy reaching polarization means 104 from the right has a first given value in response to the level of a data bit manifesting a binary "ONE" and a second given value different from the first given value in response to the level of a data bit manifesting a binary "ZERO." By choosing this latter level to be that required to provide a total phase delay equal to an integral number of wave lengths of the wave energy passing through polarization shifter 114, the amplitude of $P_2$ linearly polarized wave energy incident on polarization means 104 from the right can be made equal to zero for a binary "ZERO."

As is known in the art, mode-locking the wave energy within the optical resonant cavity defined by reflectors 100 and 102 is effected by applying the periodic signal from generator 116 to mode-locking element 112. In particular, a single, short duty cycle pulse of wave energy occurs during each cycle of the periodic signal. Since the average power of a mode-locked laser is substantially the same as an equivalent CW laser, the peak amplitude of the mode-locked pulses of wave energy is increased as an inverse function of the duty cycle of the pulses, as is known in the art.

Because generator 116 is synchronized by data bit stream source 118, the duration of each data bit will just be equal to a single cycle of the periodic signal frm generator 116. Thus, if, by way of example, each of the first and fourth of four successive data bits manifests a binary "ONE" and each of the second and third of these four successive data bits manifests a binary "ZERO," the data bit stream output signal corresponding to these four successive bits from source 118, applied to polarization shifter 114, will be that shown in the bottom graph of FIG. 2.

Assuming that level 200, manifesting a binary "ZERO," corresponds with the special case, discussed above, in which the amplitude of the $P_2$ linearly polarized component of wave energy is zero, all the wave energy traveling from right to left incident on polarization means 104 will have $P_1$ linear polarization. Therefore, all of this wave energy passes through polarization means 104 and is retained within the optical resonant cavity defined by reflectors 100 and 102. Under this condition, no output wave energy at all will be directed by polarization means 104 out the bottom thereof as output wave energy. This condition is illustrated in the top graph of FIG. 2, wherein the circulating wave energy in the optical resonant cavity, having the $P_1$ linear polarization, has the relatively high amplitude A during the second and third data bit periods when the data bit stream has level 200.

During the first and fourth data bit periods, when the data bit stream has level 202, polarization shifter 114, in the manner described above, shifts the polarization of the wave energy traveling from right to left that emerges therefrom, the wave energy incident on polarization means 104 contains a relatively small, but significant, component having $P_2$ linear polarization. However, the remainder of the wave energy traveling from right to left incident on polarization means 104 still has $P_1$ linear polarization. Therefore, during the first and fourth data bit period, when the data bit stream has level 202, $P_2$ linearly polarized output wave energy having amplitude B, as shown in the middle graph of FIG. 2, will be directed by polarization means 104 out the bottom thereof. In this case, as shown in the top graph of FIG. 2, the $P_1$ linearly polarized circulating wave energy retained in the optical resonant cavity will have an amplitude A'. While amplitude A' is somewhat lower than amplitude A, due to the fact that a portion of the wave energy in the resonant cavity is removed therefrom as output wave energy having amplitude B, still amplitude A' is sufficiently high to maintain the synchronous generation of the mode-locked pulses of circulating wave energy. Hence, the concomitant pulses of output wave energy, manifesting the binary value of each bit in the data stream, also occur synchronously.

Figure 2:
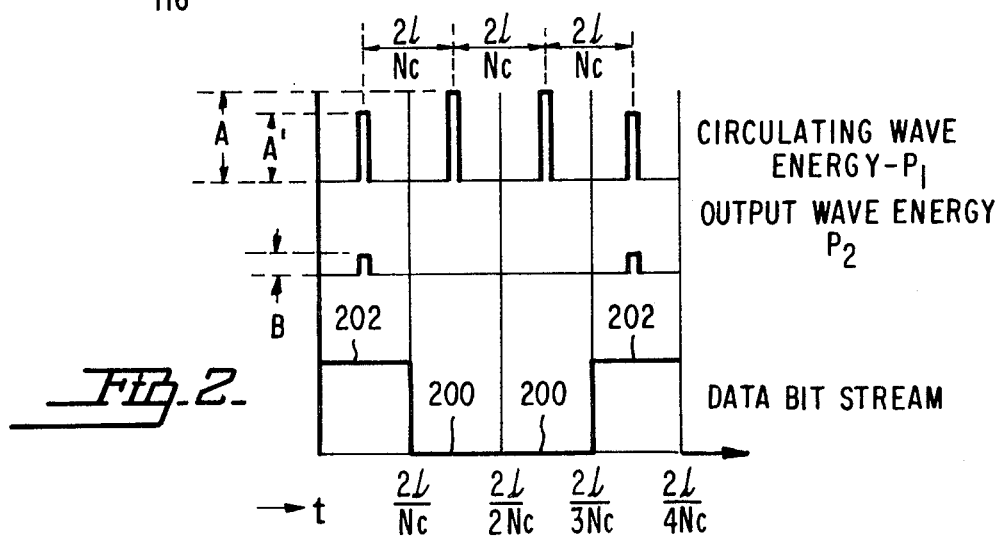
FIG. 2 is a timing diagram useful in explaining the operation of the arrangement shown in FIG. 1.

A binary "ZERO" can, of course, be manifested by the presence of a pulse of output wave energy, rather than the absence thereof as is the case in FIG. 2, so long as the relative amplitudes of the respective pulses manifesting a binary "ONE" and a binary "ZERO" are different from each other.

Figure 1A:
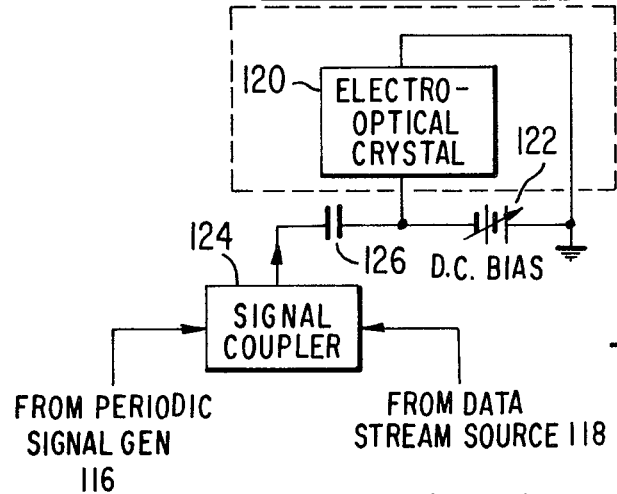
FIG. 1a shows an alternative embodiment of the modulation means of FIG. 1.

In describing modulation means 110, in connection with FIG. 1, it was assumed that the respective mode-locking function and polarization shifting function of the modulation means were accomplished by separate structural elements, consisting of mode-locking element 112 and polarization shifter 114. However, as shown in FIG. 1a, a single structural element may be employed for performing both the functions of mode-locking and polarization shifting. In particular, modulation means 110a of FIG. 1a comprises a single electro-optical crystal 120, which has a d.c. bias 122 of a given magnitude applied thereto. The signals from periodic signal source 116 and from data stream source 118 may be combined by such means as signal coupler 124, for example, and applied in common to electro-optical crystal 120 through capacitance 126. The magnitude of d.c. bias 122 is, preferably, set to that value which ensures that there will be an absence of output wave energy, having a linear polarization $P_2$, in response to the data bit stream manifesting level 200.

Figure 3:
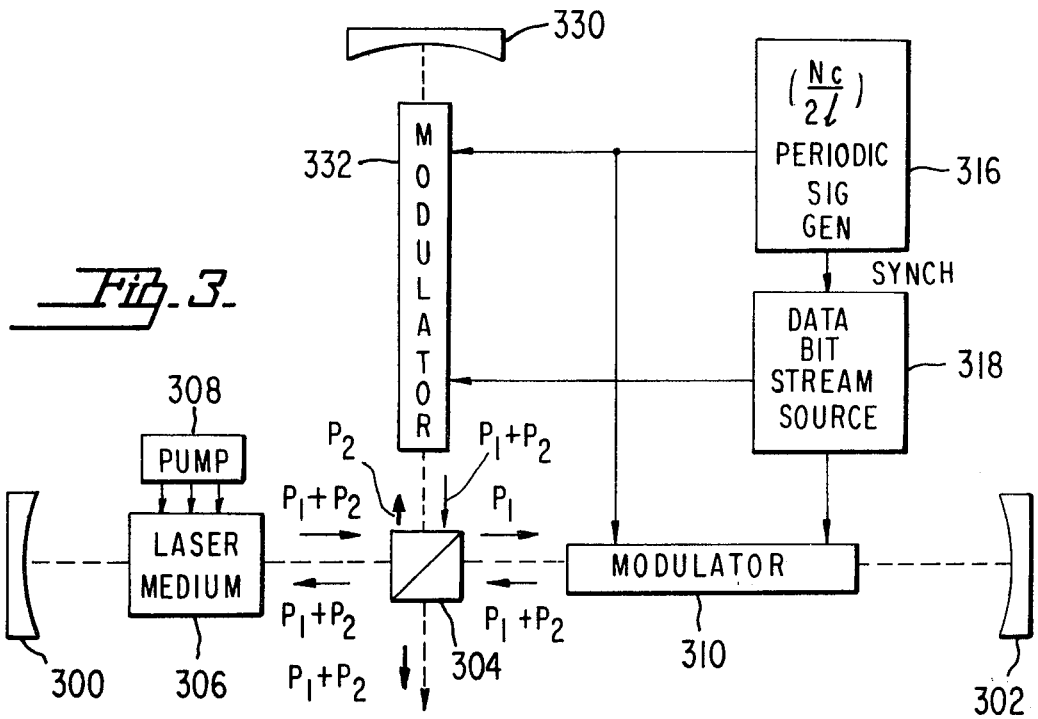
FIG. 3 illustrates a first embodiment of the present invention particularly suitable for transmitting digital data, and, FIG. 4 illustrates a second embodiment of the present invention particularly suitable for transmitting analog data.

Referring now to FIG. 3, there is shown a first optical resonant cavity defined by reflectors 300 and 302, and situated therewithin polarization means 304, laser medium 306 (pumped by pump 308) and modulator 310 (having respective signals from periodic signal generator 316 and data stream source 318 applied thereto).

Each of elements 300, 302, 304, 306, 308, 310, 316 and 318 of FIG. 3 are similar in structure to and correspond with each of respective elements 100, 102, 104, 106, 108, 110, 116 and 118 of FIG. 1, described above. In addition, FIG. 3 includes reflector 330 which cooperates with reflector 300 and polarization means 304 to form a second optical resonant cavity, and modulator 332 situated, as shown, between reflector 330 and polarization means 304 within the second optical resonant cavity. Modulator 332 is identical in structure to modulator 310. The same periodic signal applied to the mode-locking element of modulator 310 by periodic signal generator 316 is also applied to the mode-locking element of modulator 332. However, data bit stream source 318 applies a first data bit stream to the polarization shifter of modulator 310 and a second data bit stream to the polarization shifter of modulator 332. Although the data bit stream applied to modulator 332 may be identical to that applied to modulator 310, normally it represents different data. However, the respective first and second data bit streams applied respectively to each of the two modulators 310 and 332 are both synchronized by the synchronization input to data bit stream source 318 from periodic signal generator 316.

Considering now the operation of FIG. 3, laser medium 306, in response to being pumped by pump 308, generates wave energy at a given wavelength. This wave energy, which, as will be shown, is unpolarized, can be considered to be composed of a first component having a first linear polarization $P_1$, traveling from left to right, which passes through polarization means 304 and is then incident on modulator 310, and a second component having a linear polarization $P_2$, traveling from left to right, which is incident on the left side of polarization means 304 and is directed thereby out the top of polarization means 304 and is then incident on modulator 332.

The $P_1$ linearly polarized wave energy incident on the left side of modulator 310, in the process of traveling from left to right through modulator 310, being reflected from reflector 302, and then traveling from right to left back through modulator 310, may have its modulation shifted by the polarization shifter of modulator 310 in accordance with the binary value manifested by the data bit stream applied thereto. Therefore, the wave energy emerging from the left side of modulator 310 and traveling from right to left incident on the right side of polarization means 304 may include a component having $P_2$ linearly polarized wave energy, in addition to the component having $P_1$ linearly polarized wave energy. As described in connection with FIG. 1, the $P_2$ linearly polarized wave energy incident on the right side of polarization means 304 emerges from the bottom of thereof and constitutes a first component of output wave energy, while the $P_1$ linearly polarized component passes through polarization means 304 and is retained within the optic resonant cavity defined by reflector 300 and 302.

In a similar manner, $P_2$ linearly polarized wave energy incident on the bottom side of modulator 332 may have its polarization shifted by the polarization shifter of modulator 332 during its passage from bottom to top through modulator 332, reflection from reflector 330 and then its travel from top to bottom through modulator 332, so that the wave energy emerging from the bottom of modulator 332 may include a $P_1$ linearly polarized component in addition to the $P_2$ linearly polarized component, which travel from top to bottom and are incident on the top side of polarization means 304. In this case, the $P_1$ linearly polarized component will pass through polarization means 304 and emerge from the bottom thereof, constituting a second component of output wave energy. Therefore, the output wave energy emerging from the bottom of polarization means 304 includes two mutually orthogonal polarization components derived respectively by means of modulator 310 and modulator 332 of the respective first and second optical resonant cavities. The $P_2$ linearly polarized component emerging from the bottom of modulator 332 and incident on the top of polarization means 304 emerges from the left side of polarization means 304 and is retained within the second optical resonant cavity defined by reflector 300 and 330.

Thus, in the arrangement of FIG. 3, components of wave energy having both $P_1$ and $P_2$ linearly polarization are returned to the common portion of the first and second optical resonant cavities situated between reflector 300 and polarization means 304. This differs from the case in FIG. 1, where only wave energy having $P_1$ linear polarization is returned through the portion of the optical resonant cavity to the left of polarization means 104. Therefore, in the arrangement of FIG. 3, the circulating wave energy includes components of both $P_1$ and $P_2$ polarization, and thus is unpolarized. This is opposed to the arrangement in FIG. 1 where the circulating wave energy includes only $P_1$ linear polarization. One advantage of this is that the practical problem of differential heating of the laser medium, which causes birefringence which tends to detune the cavity, is much less severe in the arrangement of FIG. 3 where unpolarized wave energy passes through the laser medium than it is in the case of FIG. 1 where polarized wave energy passes through the medium.

In FIG. 3, it is essential that the respective optical length $s$ of the first and second optical resonant cavities be substantially equal to each other. The reason for this is that the circulating mode-locked pulse in the second optical resonant cavity must occur in phase coincidence with the mode-locked resonant pulse in the first optical resonant cavity, since the two optical resonant cavities share in common reflector 300, laser medium 306 and the path between reflector 300 and polarization means 304. Achieving this phase coincidence means that only a single periodic signal can be applied to the mode-locking element of respective modulators 310 and 332. Since the mode-locking frequency of this periodic signal is a function of optic length, both the first and second optical resonant cavities must, therefore, have substantially the same optical length to achieve the required phase coincidence of the mode-locked pulses from the two cavities. Furthermore, slight-third-order non-linear effects in laser medium 306 provide sufficient cross-coupling to effect phase locking of the wave energy of the coincident mode-locked pulses as they travel through laser medium 306.

Figure 4:
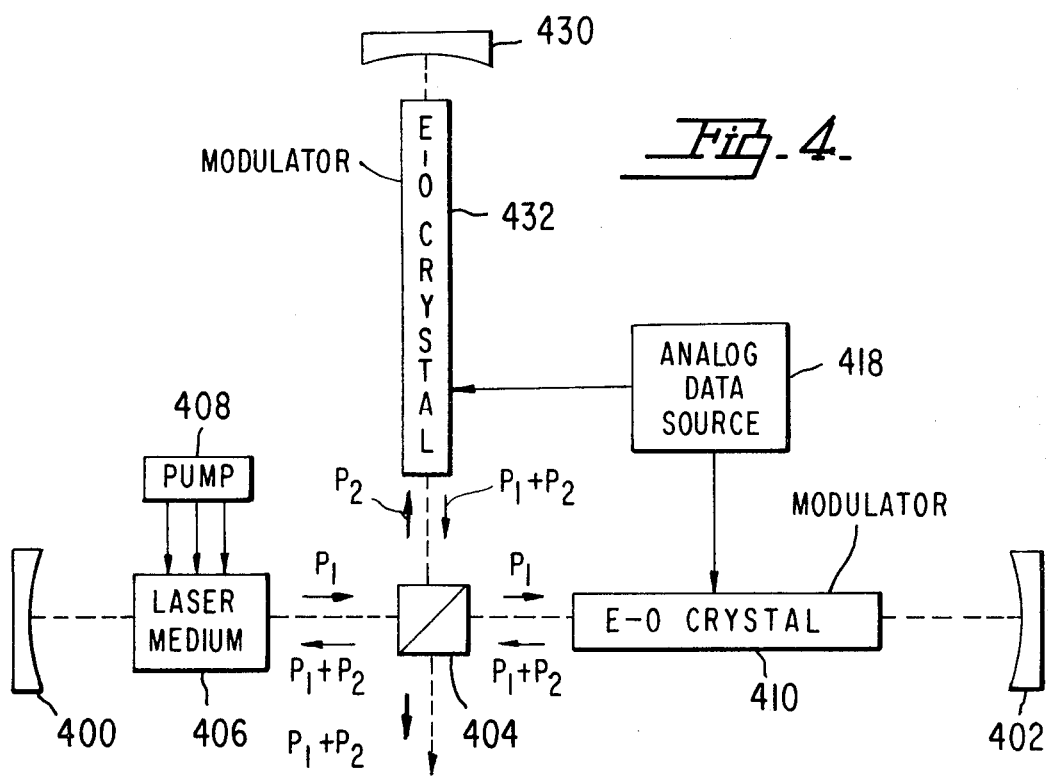

FIG. 4 shows that the principles of FIG. 3 may be employed with an analog data source. In particular, in the case of FIG. 4, mode-locking is dispensed with, analog data source 418 replaces data bit stream source 318 of FIG. 3, and modulators 410 and 432 each consist solely of an electro-optic crystal responsive to separate respective analog signals applied thereto from analog data source 418. In all other respects, the arrangement of FIG. 4 is equivalent to that of FIG. 3. Of course, in the case of FIG. 4, the output of wave energy consists of two orthogonally polarized components of continuous wave energy, each of which is individually amplitude modulated in accordance with the respective separate analog signals from analog data source 418. Since no mode-locking takes place in the arrangement of FIG. 4, the first and second optical resonant cavities need not have substantially the same optical lengths. The requirement in the case of FIG. 4 is that the optical length of the two cavities either be substantially equal to each other or differ from each other by substantially an integral number of wavelengths of the circulating wave energy.

We claim:

1. In an optical data transmission system of the type comprising three reflectors for reflecting light of certain wavelengths, an active lasing medium effective when pumped and when located in an optical resonant cavity for generating light of at least one of said certain wavelengths, and polarization means; wherein said active lasing medium is located between a first of said reflectors and said polarization means, a second of said reflectors is located with respect to said polarization means and said first reflector to form a first optical resonant cavity for a first component of said light having a first polarization which passes from said first reflector through said lasing medium and polarization means toward said second reflector, a third of said reflectors is located with respect to said polarization means and said first reflector to form a second optical resonant cavity for a second component of said light having a second polarization in quadrature with said first polarization which passes from said first reflector through said lasing medium and polarization means toward said third reflector; the improvement therein, comprising:

modulation means including a signal-controlled polarization shifter located in said first cavity between said polarization means and said second reflector for rotating the polarization of said light which passes therethrough by an amount determined in accordance with the level of a control signal applied to said polarization shifter, wherein said polarization means is oriented with respect to said polarization shifter to eject as an output from said cavities that component of said light having said second polarization which has passed from said second reflector through said polarization shifter to said polarization means, and wherein the length of each of said first and second cavities is substantially equal to an integral number of half-wavelengths of the same given one of said certain wavelengths.

2. The output data transmission system defined in claim 1, further including an analog signal source coupled to said polarization shifter to provide said control signal thereto for rotating the polarization of said light passing therethrough in accordance with the instantaneous level of said analog signal.

3. The optical data transmission system defined in claim 2, further including a second analog signal source, a second signal-controlled polarization shifter having said second signal source coupled thereto to provide said control signal thereto, said second polarization shifter being located in said second cavity between said polarization means and said third reflector for rotating the polarization of said light which passes therethrough by an amount determined in accordance with the instantaneous level of the analog signal applied thereto from said second analog signal source, and wherein said polarization means is oriented with respect to said second polarization shifter to eject as a second output from said cavities that component of said light having said first polarization which has passed from said third reflector through said second polarization shifter to said polarization means.

4. The optical data transmission system defined in claim 1, wherein said modulation means further includes mode-locking means, and wherein system further includes a periodic signal generator coupled to provide an input to said mode-locking means, said generator generating a frequency substantially equal to an integral multiple of the speed of light divided by twice the length of said first cavity to thereby effect mode-locking with said generated frequency, and a data bit stream source synchronized with said generated frequency, said data bit stream source being coupled to said polarization shifter to provide said control signal thereto.

5. The optical data transmission system defined in claim 4, wherein said first and second cavities have substantially the same length, and wherein said system further includes a second data bit stream source synchronized with said generated frequency, second modulation means comprising a second signal-controlled polarization shifter having said second data bit stream source coupled thereto to provide said control signal thereto and a second mode-locking means having said generated frequency applied thereto, said second modulation means being located in said second cavity between said polarization means and said third reflector for rotating the polarization of said light which passes through said second polarization shifter by an amount determined by said data bit stream applied thereto from said second data bit stream source, and wherein said polarization means is oriented with respect to said second polarization shifter to eject as a second output from said cavities that component of said light having said first polarization which has passed from said third reflector through said second polarization shifter to said polarization means.

* * * * *